UNITED STATES PATENT OFFICE.

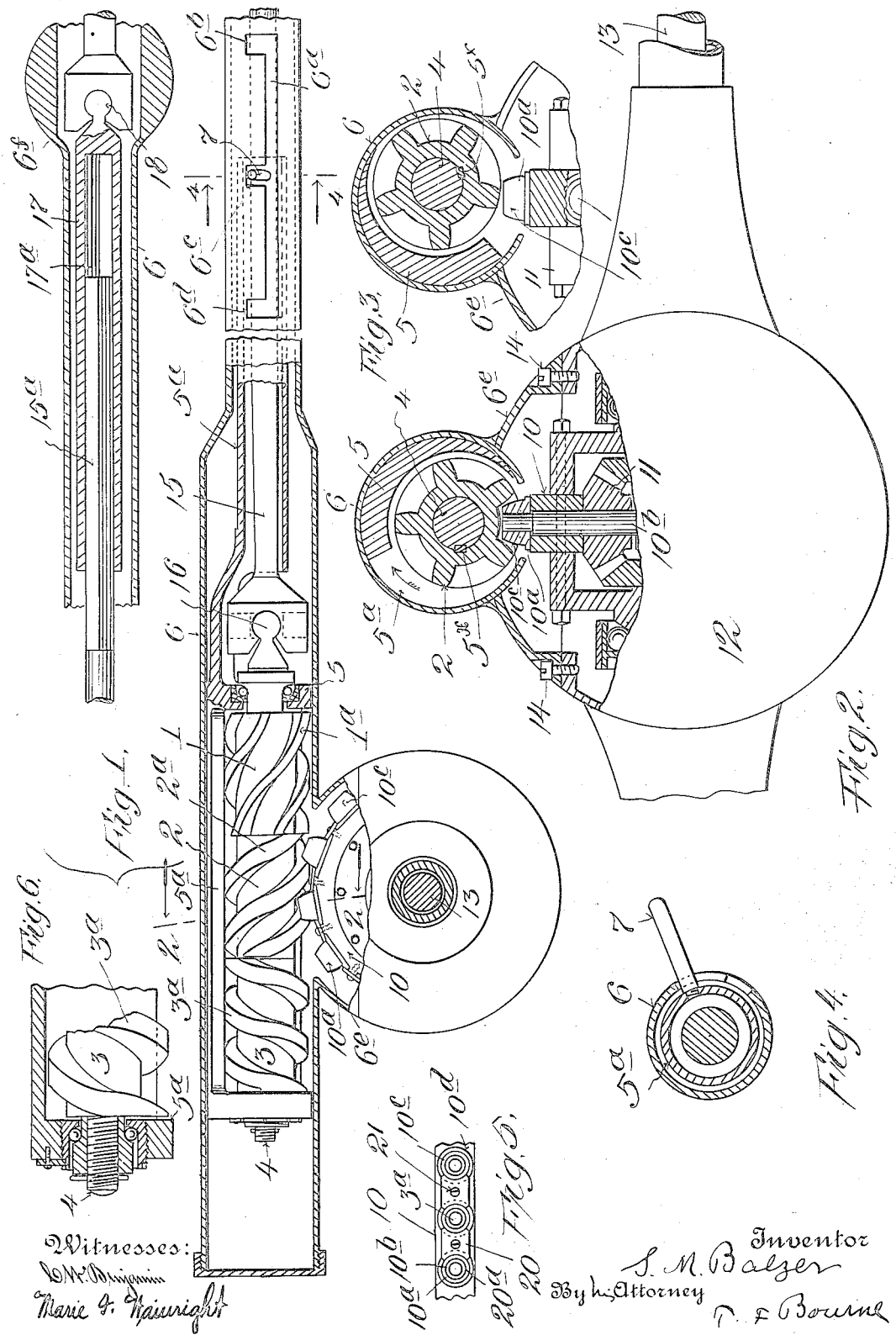

STEPHEN M. BALZER, OF ANDOVER, NEW JERSEY, ASSIGNOR TO BALZER & SON, OF ANDOVER, NEW JERSEY, A FIRM COMPOSED OF HIMSELF AND VERNON W. BALZER.

TRANSMISSION-GEARING.

1,151,648.      Specification of Letters Patent.      Patented Aug. 31, 1915.

Application filed September 22, 1911. Serial No. 650,712.

*To all whom it may concern:*

Be it known that I, STEPHEN M. BALZER, a citizen of the United States, and resident of Andover, in the county of Sussex and State of New Jersey, have invented certain new and useful Improvements in Transmission-Gearing, of which the following is a specification.

The object of my invention is to provide simple and efficient means for transmitting variable speeds from a driving to a driven member, the same being capable of rotating the driven member either forwardly or reversely.

My invention comprises a driving member having a plurality of worms of varying pitch, each capable of rotating a wheel, suitable means being provided for shifting the worms into and out of mesh with such wheel as desired, whereby said wheel may be rotated in the desired direction and at the desired speed according to which of the worms is in mesh with the teeth of said wheel.

My invention also comprises novel details of improvement that will be more fully hereinafter set forth and then pointed out in the claims.

Reference is to be had to the accompanying drawings forming part hereof, wherein, Figure 1 is a partly longitudinal sectional view of a transmission gearing embodying my invention, shown applied in connection with the differential gearing of an automobile, the two parts of Fig. 1 to be read together; Fig. 2 is an enlarged cross section on the line 2, 2, in Fig. 1, looking in the direction of the arrows; showing a worm in mesh with the worm wheel; Fig. 3 is a sectional view similar to a portion of Fig. 2 illustrating the worm out of mesh with the worm wheel; Fig. 4 is a section on the line 4, 4, in Fig. 1, Fig. 5 is a detail edge view of part of the worm wheel, and Fig. 6 is an enlarged section of a bearing for shaft 4.

Similar numerals of reference indicate corresponding parts in the several views.

At 1, 2, 3, are worms of different pitch, but the spaces between the centers of the threads of said worms are all substantially the same. Any desired number of such worms may be provided in line with each other, according to the different speeds and the direction of rotation to be imparted to the wheel 10 whose teeth $10^a$ are adapted to mesh with the threads of the different worms. I have shown worms 1, 2, as having threads adapted to operate wheel 10 in one direction, as forwardly, and worm 3 whose threads are adapted to operate wheel 10 reversely. Worms 1, 2, 3, may be applied upon a driving shaft 4, and secured thereon by means of a key $5^x$, and thereby such worms may be interchanged or replaced when it is desired to vary the ratio of the gearing. The teeth $10^a$ are at an equal distance apart upon wheel 10 and are adapted to mesh with the threads of all the worms, and since the threads of the worms have different pitches, the spaces between the centers of the threads of all the worms are, as before stated, substantially at equal distances apart, hence the widths or thicknesses of the threads of the worms vary to accommodate the teeth $10^a$. For instance, worm 1 is shown having threads $1^a$ of longer pitch than the threads $2^a$ of worm 2, and thus the threads $1^a$ are thinner than the threads $2^a$, and at least two teeth $10^a$ will constantly mesh with the threads $1^a$, whereas at least one of the teeth $10^a$ will constantly mesh with threads $2^a$ of worm 2, and so on for worms having varying pitch, and likewise the threads $3^a$ of the reversing worm 3 are thicker than the threads of worm $1^a$. In other words, whatever the pitch of the threads of the worm the distance between the centers of the threads will be substantially the same for all worms, while the thickness of the threads will vary in accordance with the pitch of the threads. By this means a wheel having teeth spaced apart a given distance between centers will coact with the threads of all the worms, the distance between the centers of whose threads is equal to the distance between the centers of the teeth of the wheel. For instance, if the distance between the centers of two teeth of wheel 10 be one and three-quarter inches, then the distance between the centers of the threads on all the worms will be substantially one and three-quarter inches.

To cause the desired worm to mesh with the teeth of wheel 10 I provide means for bodily swinging the worms to one side and out of mesh with said teeth, to shift the worms longitudinally, and to move the worms bodily back again, so that the desired shifted worm will mesh with the teeth of wheel 10. To this end I have shown shaft 4 eccentrically journaled within a sleeve 5, one side of which sleeve is cut away at 5ª to admit the teeth 10ª of wheel 10. Shaft 4 is journaled adjacent opposite ends of the series of worms within sleeve 5, suitable bearings for this purpose being provided, such as ball-bearings illustrated in Fig. 1, end thrust of the worms within sleeve 5 being provided against by such bearings. Sleeve 5 is mounted to rotate and reciprocate within a housing or tube 6, a tubular extension 5ª of sleeve 5 being shown provided with a projection 7, whereby sleeve 5, together with the worms, may be rotated or oscillated back and forth and moved longitudinally, as desired. Housing or tube 6 is shown provided with a slot 6ª receiving projection 7, said slot having offset portions 6ᵇ, 6ᶜ, and 6ᵈ corresponding in spacing to the length of the worms 1, 2, 3, whereby projections 7 may be moved into the longitudinal slot 6ª while rotating sleeve 5 and withdrawing worm 2 from mesh with teeth 10ª of wheel 10, and then projection 7 may be moved along slot 6ª to the offset slot portion 6ᵇ or 6ᵈ to bring worm 1 or worm 3 into position respecting wheel 10 (see Fig. 3), and then projection 7 will be moved into the corresponding slot portion 6ᵇ or 6ᵈ, thereby placing worm 1 or 3 into mesh with the teeth of wheel 10 as in Fig. 2.

I have shown wheel 10 as comprising the drive wheel of a differential gearing 11 adapted for an automobile, which differential gearing may be of any well known construction and maintained within a housing 12 for the running gear of the automobile, supported upon the axles 13 in any well known manner. The housing 6 is firmly united to the housing 12 so that the worms or worm wheels will be maintained in proper operative relation. To this end I have shown housing 6 provided with an extension 6ᵉ adapted to be detachably connected with housing 12, as by screws 14. The opposite end of housing 6 will be properly supported, as by means of a movable connection or ball-joint indicated at 6ᶠ, carried by the automobile frame in any well known manner. Means for rotating the worms may be arranged in any suitable manner. I have shown a drive or propeller shaft 15 connected with shaft 1 by a universal joint 16, the opposite end of shaft 15 being slidably connected with a socket piece 17 to which a universal joint 18 is connected, and the latter may be operated from a motor or engine in any well known manner. The outer end of shaft 15 is shown squared at 15ª to slide within and be rotated by the correspondingly squared socket 17ª of member 17, whereby endwise play of the parts is provided in any usual or well known manner.

While the teeth 10ª of wheel 10 may be arranged in any suitable manner, I have shown said teeth comprising radially disposed pins 10ᵇ set into wheel 10 and having substantially conically disposed rollers 10ᶜ thereon, to engage the threads of the worms. Said rollers are rotatively and detachably held upon wheel 10 by means of annular flanges 10ᵈ on said rollers engaging plates 20 detachably secured upon wheel 10 and provided with curved end portions 20ª overlying the flanges 10ᵈ, permitting rollers 10ᶜ to rotate freely. By means of screws 21 holding plates 20 upon wheel 10 said plates may be removed when it is desired to replace rollers 10ᶜ.

In accordance with my invention it will be apparent that wheel 10 may be rotated in one direction or another, at the ratio of speed desired from the propeller shaft 15, by adjusting said worms and shaft lengthwise to bring either of the worms desired into coaction with wheel 10, and that wheel 10 is rotated directly from the propeller shaft for different speeds without the intervention of other gearing, such as the customary transmission gearing of the sliding gear or planetary type as customarily installed in automobiles. By this means a large amount of weight and gearing usually employed in transmission devices for automobiles is dispensed with, and all that is required for the purpose is a limited number of worms of the character described, whereby the rotation of wheel 10 is at all times direct from the propeller shaft.

While I have described my invention as applicable in driving automobiles it will be understood that the invention may be used in other relations for transmitting power from a driving to a driven member, also that my invention is not limited to the details of construction and arrangements of parts set forth, but that the same may be varied, within the scope of the appended claims, without departing from the spirit of my invention. For instance, while the worms 1, 2, 3, may be in separate pieces secured upon a shaft, it will be understood that the worms may be cut from a single piece of material, each series of corresponding threads constituting what I term a worm, and there will be thus in reality a plurality of worms in a single piece of material instead of a plurality of separate worms secured upon a shaft.

Having now described my invention what I claim is:—

1. A transmission mechanism comprising a plurality of worms united together, one of said worms having threads of a longer pitch than the threads of another of said worms, the distance between the centers of the threads of said worms being substantially equal, means to support said worms for movement in an eccentric path and also in a longitudinal direction, and a wheel having teeth adapted to mesh with the threads of all of said worms alternately, the threads of one worm being thicker than the threads of another worm.

2. A transmission mechanism comprising a plurality of worms united together and having threads of varying pitch, a wheel having teeth adapted to mesh with the threads of all of said worms, alternately, means eccentric to the axis of said worms to disengage said worms from said teeth, and means to adjust said worms and eccentric means longitudinally for engagement with said teeth.

3. A transmission mechanism comprising a plurality of worms united together and having teeth of varying pitch, a wheel having teeth adapted to mesh with the threads of all of said worms, alternately, means eccentric to the axis of said worms to rotate said worms bodily out of and into mesh with said teeth, and means to adjust said worms and eccentric means longitudinally when out of mesh with said teeth and for holding said worms in set position.

4. A transmission mechanism comprising a plurality of worms having threads of varying pitch, a sleeve, means for rotatively supporting said worms within said sleeve, a wheel having teeth adapted to mesh with the threads of all of said worms, means to cause disengagement of said worms with said teeth, and means for adjusting said sleeve and worms longitudinally and holding them in set position.

5. A transmission mechanism comprising a plurality of worms having threads of varying pitch, a sleeve, means eccentrically supporting said worms within said sleeve, means to rotatively support said sleeve and permit longitudinal adjustment thereof, and a wheel having teeth adapted to mesh with the threads of all of said worms alternately.

6. A transmission mechanism comprising a plurality of worms having teeth of varying pitch, a sleeve rotatively supporting said worms, said worms being eccentrically mounted in said sleeve, a housing rotatively and slidably supporting said sleeve, and a wheel having teeth adapted to mesh with the threads of said worms.

7. A transmission mechanism comprising a plurality of worms having teeth of varying pitch, a sleeve rotatively supporting said worms, said worms being eccentrically mounted in said sleeve, a housing rotatively and slidably supporting said sleeve, a wheel having teeth adapted to mesh with the threads of all of said worms alternately, and means to rotate said sleeve and move it longitudinally, and to hold said sleeve in set position.

8. A transmission mechanism comprising a plurality of worms having teeth of varying pitch, a sleeve rotatively supporting said worms, said worms being eccentrically mounted in said sleeve, a housing rotatively and slidably supporting said sleeve, a wheel having teeth adapted to mesh with the threads of said worms, said housing being provided with a slot having offset portions corresponding in spacing to said worms, and a projection connected with said worms and movable in said slot for adjusting and holding said worms in set position.

9. The combination of a plurality of worms having threads of varying pitch, a sleeve receiving said worms, and bearings at opposite ends of the worms rotatively and eccentrically supporting the same within the sleeve, and means to move the sleeve and worms longitudinally.

Signed at New York city, in the county of New York, and State of New York, this 20th day of September A. D. 1911.

STEPHEN M. BALZER.

Witnesses:
HERMAN HERST,
T. F. BOURNE.